: US 11,091,506 B2
(45) Date of Patent: Aug. 17, 2021

(12) United States Patent
Yamauchi (54) SILANOL COMPOSITION, CURED PRODUCT, ADHESIVE, AND METHOD FOR CURING SILANOL COMPOSITION (71) Applicant: Asahi Kasei Kabushiki Kaisha, Tokyo (JP)

(72) Inventor: Kazuhiro Yamauchi, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/638,978

(22) PCT Filed: Aug. 10, 2018

(86) PCT No.: PCT/JP2018/030017
§ 371 (c)(1),
(2) Date: Feb. 13, 2020

(87) PCT Pub. No.: WO2019/035417
PCT Pub. Date: Feb. 21, 2019

(65) Prior Publication Data
US 2020/0369690 A1  Nov. 26, 2020

(30) Foreign Application Priority Data

Aug. 16, 2017 (JP) .............................. JP2017-157074
Dec. 18, 2017 (JP) .............................. JP2017-242154
Dec. 18, 2017 (JP) .............................. JP2017-242155
Dec. 18, 2017 (JP) .............................. JP2017-242161

(51) Int. Cl.
*C08G 77/16* (2006.01)
*C07F 7/21* (2006.01)
*C08G 77/04* (2006.01)
*C08G 77/00* (2006.01)
*C08K 3/36* (2006.01)
*C09J 183/06* (2006.01)

(52) U.S. Cl.
CPC .............. *C07F 7/21* (2013.01); *C08G 77/045* (2013.01); *C08G 77/16* (2013.01); *C08G 77/80* (2013.01); *C08K 3/36* (2013.01); *C09J 183/06* (2013.01)

(58) Field of Classification Search
CPC ......... C08G 77/16; C09J 183/06; C08L 83/06
See application file for complete search history.

(56) References Cited

U.S. PATENT DOCUMENTS

| 6,340,735 | B1 | 1/2002 | Yagihashi |
| 8,883,951 | B2* | 11/2014 | Hwang ................ C08G 77/045 528/20 |
| 2005/0038220 | A1 | 2/2005 | Shin et al. |
| 2006/0041098 | A1 | 2/2006 | Kennedy et al. |
| 2006/0199935 | A1* | 9/2006 | Morita ..................... C07F 7/21 528/37 |
| 2006/0270789 | A1 | 11/2006 | Osawa |
| 2007/0088144 | A1 | 4/2007 | Kang et al. |
| 2012/0004326 | A1 | 1/2012 | Baek et al. |
| 2013/0165617 | A1 | 6/2013 | Hwang et al. |
| 2014/0275445 | A1 | 9/2014 | Yamanaka et al. |
| 2014/0287225 | A1 | 9/2014 | Hirano et al. |

FOREIGN PATENT DOCUMENTS

| CN | 106279695 A | 1/2017 |
| JP | H03-186807 A | 8/1991 |
| JP | 2000-281904 A | 10/2000 |
| JP | 2001-048891 A | 2/2001 |
| JP | 2003-119385 A | 4/2003 |
| JP | 2005-523377 A | 8/2005 |
| JP | 2006-273845 A | 10/2006 |
| JP | 2006-335792 A | 12/2006 |
| JP | 2007-023163 A | 2/2007 |
| JP | 2007-026889 A | 2/2007 |
| JP | 2007-238848 A | 9/2007 |
| JP | 2007-291273 A | 11/2007 |
| JP | 2013-001813 A | 1/2013 |
| JP | 2013-103415 A | 5/2013 |
| JP | 2013-108063 A | 6/2013 |
| JP | 2014-237799 A | 12/2014 |
| JP | 2016-141615 A | 8/2016 |

OTHER PUBLICATIONS

International Preliminary Report on Patentability and Written Opinion issued in corresponding International Patent Application No. PCT/JP2018/030017 dated Feb. 18, 2020.
European Search Report issued in counterpart European Patent Application No. 18845624.8 dated Jul. 23, 2020.
Unno et al., "Synthesis and Structures of Extended Cyclic Siloxanes," Heteroatom Chemistry, 25 (6): 525-532 (2014).
International Search Report issued in corresponding International Patent Application No. PCT/JP2018/030017 dated Nov. 6, 2018.

(Continued)

*Primary Examiner* — Margaret G Moore
(74) *Attorney, Agent, or Firm* — Morgan, Lewis & Bockius LLP (57) ABSTRACT

The present invention provides a silanol composition including a cyclic silanol (A1) represented by the following formula (1):

Formula (I)

[Chemical structure: cyclic siloxane with four Si atoms bridged by O, with HO and $R^1$ on one Si, $R^2$ and OH on another Si, HO and $R^4$ on a third Si, and $R^3$ and OH on the fourth Si]

wherein $R^1$ to $R^4$ are each independently fluorine, an aryl group, a vinyl group, an allyl group, a fluorine-substituted linear or branched alkyl group having 1 to 4 carbon atoms, or an unsubstituted linear or branched alkyl group having 1 to 4 carbon atoms; and a dehydration condensation product of the cyclic silanol (A2), and wherein the silanol composition has a haze of 10% or less at a thickness of 3 μm.

12 Claims, 2 Drawing Sheets

(56) References Cited

OTHER PUBLICATIONS

Unno et al., "Stereoisomers of 1,3,5,7-Tetrahaydroxy-1,3,5,7-tetraisopropylcyclotetrasiloxane: Synthesis and Structures in Crystal," Journal of the American Chemical Society, 127: 2256-2263 (2005).

Pozdnyakova et al., "Cyclotetrasiloxanetetrols with Methyl Groups at Silicon: Isomers all-cis and cis-tran-cis-[MeSi(O)OH]4," Inorganic Chemistry, 49: 572-577 (2010).

Huang Wenrun, "Silane coupling agent and silicone resin," Chengdu Sichuan Science and Technology Press, 194-195 (2010) (see CN Search Report).

Search Report issued in corresponding Chinese Patent Application No. 201880049277X dated May 8, 2021.

\* cited by examiner

SILANOL COMPOSITION, CURED PRODUCT, ADHESIVE, AND METHOD FOR CURING SILANOL COMPOSITION

TECHNICAL FIELD

The present invention relates to a silanol composition, a cured product and an adhesive comprising the silanol composition, and a method for curing a silanol composition.

BACKGROUND ART

Cyclic silanols are compounds having skeletons in which cyclic structures are formed by siloxane bonds, and curable compositions comprising such compounds are used for the protection, sealing, and adhesion of semiconductor devices such as light-emitting diode devices. In addition, cyclic silanols can change or adjust the wavelength of light emitted from light-emitting diode devices and are used in applications such as lenses.

In recent years, cyclic silanols whose structures are precisely controlled have been reported. For example, Non Patent Literature 1 discloses the all-trans isomer of tetrahydroxytetramethyltetracyclosiloxane.

CITATION LIST

Non Patent Literature

Non Patent Literature 1: Inorganic Chemistry Vol. 49, No. 2, 2010

SUMMARY OF INVENTION

Technical Problem

However, a problem is that when a curable composition comprising the all-trans isomer of tetrahydroxytetramethyltetracyclosiloxane disclosed in Non Patent Literature 1 is applied to objects to be protected, sealed, and adhered, sufficient adhesive force does not occur.

In addition, when cyclic silanols and compositions comprising such cyclic silanols are applied to optical materials for lenses and the like, transparency (that is, light transmission properties) is needed when the cyclic silanols and the compositions comprising such cyclic silanols are formed into cured products.

Accordingly, it is an object of the present invention to provide a composition comprising a cyclic silanol that is excellent in adhesive force and provides a cured product having transparency.

Solution to Problem

The present inventors have diligently pursued studies in order to solve the above problems, and as a result found that a silanol composition comprising a cyclic silanol and a dehydration condensation product of the cyclic silanol and having a particular haze is excellent in adhesive force and provides a cured product excellent in transparency, and completed the present invention.

Specifically, the present invention is as follows.

A silanol composition comprising:
a cyclic silanol (A1) represented by the following formula (1):

Formula (1)

wherein $R^1$ to $R^4$ are each independently fluorine, an aryl group, a vinyl group, an allyl group, a fluorine-substituted linear or branched alkyl group having 1 to 4 carbon atoms, or an unsubstituted linear or branched alkyl group having 1 to 4 carbon atoms; and a dehydration condensation product (A2) of the cyclic silanol, and wherein the silanol composition has a haze of 10% or less at a thickness of 3 μm.

The silanol composition according to [1], wherein the cyclic silanol (A1) comprises cyclic silanols (B1) to (B4) represented by the following formulas (2) to (5):

(B1)

(2)

(B2)

(3)

(B3)

(4)

(B4)

(5)

wherein $R^1$ to $R^4$ are each independently fluorine, an aryl group, a vinyl group, an allyl group, a fluorine-substituted linear or branched alkyl group having 1 to 4 carbon atoms, or an unsubstituted linear or branched alkyl group having 1 to 4 carbon atoms, and 0<b≤20 is satisfied when a proportion (mol %) of the cyclic silanol (B2) with respect to a total amount of the cyclic silanols (B1) to (B4) is b.

The silanol composition according to [1] or [2], wherein an area of the dehydration condensation product (A2) is more than 0% and 50% or less with respect to a total area of the cyclic silanol (A1) and the dehydration condensation product (A2) in a gel permeation chromatography measurement.

The silanol composition according to any of [1] to [3], wherein a proportion of a transition metal is less than 1 ppm.

The silanol composition according to any of [1] to [4], comprising a solvent.

The silanol composition according to any of [1] to [5], comprising a silica particle having an average particle diameter of 1 nm or more and 100 nm or less.

The silanol composition according to any of [1] to [6], comprising a both-terminal silanol-modified siloxane represented by the following formula (6):

(6)

wherein each R' is independently fluorine, an aryl group, a vinyl group, an allyl group, a fluorine-substituted linear or branched alkyl group having 1 to 4 carbon atoms, or an unsubstituted linear or branched alkyl group having 1 to 4 carbon atoms, and m is an integer of 0 to 1000.

The silanol composition according to any of [1] to [7], wherein a total content of Na and V is less than 60 ppm.

A cured product comprising the silanol composition according to any of [1] to [8].

An adhesive comprising the silanol composition according to any of [1] to [8].

A method for curing the silanol composition according to any of [1] to [8], comprising:

thermally curing the silanol composition at 60 to 250° C.

The method according to [11], wherein the silanol composition is thermally cured for 10 min to 48 h.

Advantageous Effect of Invention

The present invention can provide a silanol composition that is excellent in adhesive force and provides a cured product excellent in transparency.

DESCRIPTION OF EMBODIMENT

A mode for carrying out the present invention (hereinafter also referred to as "this embodiment") will be described in detail below. The present invention is not limited to this embodiment, and various modifications can be made without departing from the spirit thereof.

(Silanol Composition)

The silanol composition in this embodiment comprises a cyclic silanol (A1) represented by formula (1) and a dehydration condensation product (A2) of the cyclic silanol. The silanol composition in this embodiment has a haze of 10% or less at a thickness of 3 μm.

Formula (1)

wherein $R^1$ to $R^4$ are each independently fluorine, an aryl group, a vinyl group, an allyl group, a fluorine-substituted linear or branched alkyl group having 1 to 4 carbon atoms, or an unsubstituted linear or branched alkyl group having 1 to 4 carbon atoms.

Examples of the aryl group in this embodiment include a phenyl group and a naphthyl group.

Examples of the fluorine-substituted linear or branched alkyl having 1 to 4 carbon atoms in this embodiment include the following groups:

Examples of the unsubstituted linear or branched alkyl having 1 to 4 carbon atoms in this embodiment include methyl, ethyl, n-propyl, isopropyl, n-butyl, isobutyl, and tert-butyl.

The $R^1$ to $R^4$ groups in this embodiment are each independently preferably an unsubstituted linear or branched alkyl having 1 to 4 carbon atoms.

The silanol composition in this embodiment has a haze of 10% or less at a thickness of 3 μm. When the haze of the silanol composition is 10% or less, the transparency when the silanol composition is formed into a cured product tends to be high, and the adhesive force tends to be excellent.

Examples of the method for setting the haze in the silanol composition at 10% or less include a method of adjusting the proportions of the isomers in the cyclic silanol (A1) represented by formula (1) to decrease the proportions of the isomers having high crystallinity, and a method of reducing the amounts of metals contained in the composition.

The haze of the silanol composition is preferably 5% or less, more preferably 2% or less, and further preferably 1% or less.

The haze of the silanol composition can be specifically measured by a method described in Examples.

The silanol composition in this embodiment comprises a dehydration condensation product of a cyclic silanol represented by formula (1). The dehydration condensation product of the cyclic silanol represented by formula (1) is a compound obtained by a reaction in which at least one of the silanol groups of a cyclic silanol represented by formula (1) undergoes dehydration condensation with at least one silanol group in at least one another cyclic silanol molecule represented by formula (1) to form a siloxane bond.

The dehydration condensation product of the cyclic silanol represented by formula (1), for example, can be schematically represented by the following formula (7):

Formula (7)

wherein four R are each independently any of $R^1$ to $R^4$ in formula (1) and are each independently fluorine, an aryl group, a vinyl group, an allyl group, a fluorine-substituted linear or branched alkyl having 1 to 4 carbon atoms, or an unsubstituted linear or branched alkyl having 1 to 4 carbon atoms, and m is an integer of 2 or more. The silanol group in the cyclic silanol that undergoes dehydration condensation may be any silanol group. At this time, in the dehydration condensation product represented by formula (7), two or more siloxane bonds may be formed between two or more molecules of cyclic silanol structures. Examples of preferred groups for R in formula (7) can include the same preferred groups as for the $R^1$ to $R^4$ groups.

Specific examples of the dehydration condensation product of the cyclic silanol represented by formula (1) include the following compounds. However, the dehydration condensation product of the cyclic silanol represented by formula (1) is not limited to the following compounds.

The orientation of the hydroxy groups (—OH) and the R groups with respect to the cyclic silanol skeletons in the following compounds is not limited. Each R in the following compounds is independently any of $R^1$ to $R^4$ in formula (1). Further, examples of preferred groups for R in the following compounds can include the same preferred groups as for the $R^1$ to $R^4$ groups.

The dehydration condensation product of the cyclic silanol represented by formula (1) preferably has a molecular weight of 500 to 1,000,000, more preferably 500 to 100,000, and further preferably 500 to 10,000 as calculated by gel permeation chromatography measurement.

In the silanol composition in this embodiment, the area of the dehydration condensation product (A2) is preferably more than 0% and 50% or less with respect to the total area of the cyclic silanol (A1) and the dehydration condensation product (A2) in gel permeation chromatography measurement. The area of each compound obtained by gel permeation chromatography measurement represents the content of each compound in the silanol composition.

When the area of A2 is more than 0% and 50% or less, the viscosity tends not to be too high, and an organic solvent and water tend to be easily removed from the silanol composition comprising the organic solvent and water, when the silanol composition is produced.

The area of A2 is more preferably more than 0% and 40% or less, further preferably more than 0% and 25% or less.

The area of A2, that is, the content of A2, can be controlled, for example, by purification after an oxidation reaction when a hydrosilane compound is oxidized in the production of the silanol composition to obtain the cyclic silanol.

The measurement of the areas of A1 and A2, that is, the content of A1 and A2, by gel permeation chromatography can be specifically performed by a method described in Examples.

The silanol composition in this embodiment can be prepared, for example, by oxidizing a hydrosilane compound in the presence of water or an alcohol. For the hydrosilane compound, any tetrasubstituted tetracyclosiloxane containing hydrogen can be used, and commercial products can be used.

The hydrosilane compound is preferably a tetrasubstituted tetracyclosiloxane represented by the following formula (8):

(8)

wherein $R^1$ to $R^4$ are each independently fluorine, an aryl group, a vinyl group, an allyl group, a fluorine-substituted linear or branched alkyl group having 1 to 4 carbon atoms, or an unsubstituted linear or branched alkyl having 1 to 4 carbon atoms.

Specific examples of the cyclic hydrosilane compound include tetramethyltetracyclosiloxane.

Generally, the cyclic hydrosilane compound has no hydroxy or alkoxy functional groups, but such functional groups may be contained in a certain amount before an oxidation reaction.

Examples of the method for oxidizing the hydrosilane compound include a method using a catalyst and/or an oxidant.

As the catalyst, for example, metal catalysts such as Pd, Pt, and Rh can be used. One of these metal catalysts may be used alone, or two or more of these metal catalysts may be used in combination. These metal catalysts may be supported on supports such as carbon.

As the oxidant, for example, peroxides can be used. As the peroxides, any can be used, and examples thereof include oxiranes such as dimethyldioxirane.

As the method for oxidizing the hydrosilane compound, Pd/carbon is preferably used from the viewpoint of reactivity, and the ease of catalyst removal after the reaction.

The cyclic silanol prepared by oxidizing the hydrosilane compound in the presence of water or an alcohol has a cyclic structure and therefore comprises various isomers derived from the cis and trans of the hydrogen atoms of the SiH groups of the starting material.

The cyclic hydrosilane compound represented by the formula (8) is obtained by the hydrolysis of chlorosilane or the equilibration polymerization reaction of polymethylsiloxane. It is difficult to control the proportions of isomers derived from cis and trans, and therefore various isomers derived from cis and trans are mixed in the cyclic hydrosilane compound. The cis and trans of the cyclic hydrosilane compound in this embodiment respectively indicate that the orientation of adjacent two hydroxy groups or adjacent two R groups with respect to the cyclic siloxane skeleton is the same (cis), and that the orientation of adjacent two hydroxy groups or adjacent two R groups with respect to the cyclic siloxane skeleton is different (trans).

Examples of the isomers contained in the cyclic silanol produced by the above-described oxidation reaction include an all-cis cyclic silanol (B1) represented by the following formula (2). In the all-cis cyclic silanol (B1), all hydroxy groups and $R^1$ to $R^4$ groups are each arranged in the same direction with respect to the cyclic siloxane skeleton, as shown by formula (2).

(2)

wherein $R^1$ to $R^4$ are each independently fluorine, an aryl group, a vinyl group, an allyl group, a fluorine-substituted linear or branched alkyl having 1 to 4 carbon atoms, or an unsubstituted linear or branched alkyl having 1 to 4 carbon atoms.

Due to the all-cis cyclic silanol (B1) represented by formula (2), the cyclic silanol synthesized from the cyclic hydrosilane compound by the oxidation reaction tends to cloud. This phenomenon is considered to be due to the fact that the all-cis cyclic silanol (B1) has crystallinity, and is significant particularly during storage and in the case of freezing and storage at −30° C. By removing a cyclic silanol having high crystallinity, the silanol is prevented from crystallizing and precipitating in the silanol composition, a silanol composition having high transparency is obtained, and a cured product having high transparency can also be obtained. In addition, by removing a cyclic silanol having high crystallinity, the adhesive force of the silanol composition improves.

From the viewpoint of obtaining a silanol composition having high transparency, the proportion of the cyclic silanol (B1) is preferably reduced.

Examples of the method for reducing the proportion of the cyclic silanol (B1) include a method combining a recrystallization operation and the removal of crystals.

More specifically, by adding a poor solvent to a good solvent solution of the product obtained in the synthesis of the cyclic silanol, the cyclic silanol (B1) precipitates as crystals. By removing the precipitated cyclic silanol (B1) and concentrating the solution of the soluble portion, the proportion of the cyclic silanol (B1) in the silanol composition is reduced, and a silanol composition having high transparency can be obtained.

When the recrystallization operation is performed, the cooling temperature is preferably less than 10° C. from the viewpoint of obtaining a silanol composition having high transparency. From the viewpoint of the improvement of the yield of the cyclic silanol, the amount (volume) of the poor solvent is preferably equal to or more than the amount of the good solvent and 20 times or less.

Examples of the good solvent include tetrahydrofuran, diethyl ether, acetone, methanol, ethanol, isopropanol, dimethylformamide, dimethyl sulfoxide, glycerin, ethylene glycol, and methyl ethyl ketone. One of these good solvents may be used alone, or two or more of these good solvents may be used in combination.

Examples of the poor solvent include toluene, chloroform, hexane, dichloromethane, and xylene. One of these poor solvents may be used alone, or two or more of these poor solvents may be used in combination.

The proportion of the cyclic silanol (B1) can be calculated by subjecting the cyclic silanol obtained by the synthesis to $^1$H-NMR measurement. Specifically, in $^1$H-NMR measurement, the hydrogen contained in the $R^1$ to $R^4$ groups of the cyclic silanol (B1) is observed on the highest magnetic field side with respect to the hydrogen in the $R^1$ to $R^4$ groups of other isomers of the cyclic silanol. Therefore, the proportion of the cyclic silanol (B1) is calculated from the integral values of these hydrogens.

When a metal catalyst is used in the oxidation of the hydrosilane compound, the transition metal contained in the metal catalyst remains in the insoluble matter residue by the above-described recrystallization operation, and therefore the proportion of the transition metal in the filtrate can be reduced by the operation of removing the crystals. Therefore, the coloration of the silanol derived from the remaining of the metal catalyst can also be reduced by the operation for removing the cyclic silanol represented by formula (2).

From the viewpoint of increasing the light transmission properties of the silanol composition, the proportion of the transition metal is preferably less than 1 ppm with respect to the total weight of the silanol composition.

The proportion of the transition metal can be specifically measured by a method described in Examples.

Examples of the transition metal include palladium.

When oxidation is performed using, for the starting material, the tetrasubstituted tetracyclosiloxane represented by formula (8) as the hydrosilane compound, cyclic silanols (B1) to (B4) represented by the following formulas (2) to (5) may be mixed in the obtained tetrahydroxy-tetrasubstituted tetracyclosiloxane, and the tetrahydroxy-tetrasubstituted tetracyclosiloxane preferably comprises the cyclic silanols (B1) to (B4).

(B1)

(2)

(B2)

(3)

(B3)

(4)

(B4)

(5)

wherein $R^1$ to $R^4$ are each independently fluorine, an aryl group, a vinyl group, an allyl group, a fluorine-substituted linear or branched alkyl group having 1 to 4 carbon atoms, or an unsubstituted linear or branched alkyl group having 1 to 4 carbon atoms.

Preferred groups for $R^1$ to $R^4$ in formulas (2) to (5) are the same as the preferred groups for $R^1$ to $R^4$ in formula (1).

It is preferred that the cyclic silanol (A1) in this embodiment contains the cyclic silanols (B1) to (B4) represented by formulas (2) to (5), and 0 < b ≤ 20 is satisfied when the proportion (mol %) of the cyclic silanol (B2) with respect to the total amount of the cyclic silanols (B1) to (B4) is b.

Examples of the method for setting the proportion b at 0<b≤20 include a method combining a recrystallization operation and the removal of crystals, as described above.

When oxidation is performed using, for the starting material, tetramethyltetracyclosiloxane as the hydrosilane compound, six types of peaks of four types of isomers are observed (here, three types of peaks are observed for trans-trans-cis) when the $^1$H-NMR of the obtained tetrahydroxytetramethyltetracyclosiloxane is measured. The hydrogen in the $R^1$ to $R^4$ groups is observed in the order of all-cis (cyclic silanol (B1)), trans-trans-cis (cyclic silanol (B3)), trans-trans-cis (cyclic silanol (B3)), cis-trans-cis (cyclic silanol (B2)), all-trans (cyclic silanol (B4)), and trans-trans-cis (cyclic silanol (B3)) types from the high magnetic field side, and therefore from the integral values of such hydrogen, the respective proportions of the cyclic silanols (B1) to (B4) are calculated.

The cyclic silanol (B2) represented by formula (3) also has crystallinity, and therefore when a good solvent is used for the reaction solution, the cyclic silanol (B2) precipitates as crystals by adding a poor solvent. Due to the cyclic silanol (B2), the synthesized cyclic silanol (A1) tends to cloud. This phenomenon is considered to be due to the fact that the cis-trans-cis cyclic silanol (B2) has crystallinity, and is significant particularly during storage and in the case of freezing and storage at −30° C.

From the viewpoint of obtaining a silanol composition having high transparency, the proportion of the cyclic silanol (B2) is preferably 0% to 50%, more preferably 0% to 40%, further preferably 0 to 35%, and still further preferably 0% or more and less than 35% with respect to the cyclic silanol represented by formula (1).

The silanol composition in this embodiment is preferably produced by oxidizing a hydrosilane compound in the presence of water or an alcohol to prepare a cyclic silanol, adding a poor solvent to a good solvent solution of the product obtained in the synthesis of the cyclic silanol, to perform recrystallization, performing filtration, and concentrating the solution of the soluble portion obtained by the filtration, as described above.

In the production of the silanol composition in this embodiment, the concentration of the solution of the soluble portion should be optionally performed, and the solution of the soluble portion itself may be used as the silanol composition. In addition, in the concentration of the solution of the soluble portion, it is not necessary to remove all the solvent contained in the solution, and therefore the silanol composition in this embodiment may be a crude concentrate obtained by distilling off some of the solvent contained in the solution of the soluble portion. Further, the silanol composition in this embodiment may be one obtained by concentrating the solution of the soluble portion and then rediluting the concentrate with a solvent. As described above, one preferred mode of this embodiment is a silanol composition comprising a solvent.

The amount of the solvent in the silanol composition comprising the solvent is not particularly limited but is preferably 95% by mass or less, more preferably 90% by mass or less, and further preferably 85% by mass or less with respect to the total amount of the silanol composition. The lower limit value of the amount of the solvent is not particularly limited but is usually 1% by mass or more.

Examples of the solvent in the silanol composition comprising the solvent include the water and/or the alcohol used in the reaction, and the good solvent and the poor solvent used during the recrystallization. Specific examples of the solvent include, but are not limited to, water, tetrahydrofuran, diethyl ether, acetone, methanol, ethanol, isopropanol, dimethylformamide, dimethyl sulfoxide, glycerin, ethylene glycol, methyl ethyl ketone, toluene, chloroform, hexane, dichloromethane, and xylene. These solvents may each be one alone or may be a combination of two or more.

The silanol composition in this embodiment preferably further comprises a silica particle having an average particle diameter of 1 nm or more and 100 nm or less.

When the average particle diameter of the silica particle is 1 nm or more, the abrasion resistance tends to be excellent. When the particle diameter of the silica particle is 100 nm or less, the transparency and dispersibility tend to be excellent.

The average particle diameter of the silica particle is preferably 1 nm or more and 50 nm or less, more preferably 2 nm or more and 30 nm or less, and further preferably 5 nm or more and 20 nm or less.

The average particle diameter of the silica particle can be measured by dynamic light scattering measurement.

As the silica particle having an average particle diameter of 1 nm or more and 100 nm or less, their form is not particularly limited as long as the transparency of the silanol composition in this embodiment can be maintained. The silica particle can be used in the form of the usual aqueous dispersion or in the form of being dispersed in an organic solvent, but from the viewpoint of uniformly and stably dispersing the silica particle in the silanol composition, colloidal silica dispersed in an organic solvent is preferably used.

Examples of the organic solvent in which the silica particle are to be dispersed include, but are not limited to, methanol, isopropyl alcohol, n-butanol, ethylene glycol, xylene/butanol, ethyl cellosolve, butyl cellosolve, dimethylformamide, dimethylacetamide, methyl ethyl ketone, and methyl isobutyl ketone.

Among these, an organic solvent in which the silanol composition can be dissolved is preferably selected from the viewpoint of uniformly dispersing the silica particle in the silanol composition.

The colloidal silica in the form of being dispersed in an organic solvent is not limited to the following, but, for example, commercial products such as methanol silica sol MA-ST, isopropyl alcohol silica sol IPA-ST, n-butanol silica sol NBA-ST, ethylene glycol silica sol EG-ST, xylene/butanol silica sol XBA-ST, ethyl cellosolve silica sol ETC-ST, butyl cellosolve silica sol BTC-ST, dimethylformamide silica sol DBF-ST, dimethylacetamide silica sol DMAC-ST, methyl ethyl ketone silica sol MEK-ST, and methyl isobutyl ketone silica sol MIBK-ST (trade names, manufactured by Nissan Chemical Industries, Ltd.) can be used.

When the silanol composition in this embodiment further comprises a silica particle having an average particle diameter of 1 nm or more and 100 nm or less, the silanol composition is preferably produced by oxidizing a hydrosilane compound in the presence of water or an alcohol to prepare a cyclic silanol, adding a poor solvent to a good solvent solution of the product obtained in the synthesis of the cyclic silanol, to perform recrystallization, performing filtration, concentrating the solution of the soluble portion obtained by the filtration, and further adding a silica particle or a silica particle dispersion having an average particle diameter of 1 nm or more and 100 nm or less, as described above.

The content of the silica particle in the silanol composition in this embodiment is preferably 10 to 80% by mass, more preferably 20 to 70% by mass, and further preferably 30 to 60% by mass with respect to the total amount of the solids in the silanol composition.

When the content of the silica particle is 10% by mass or more, the abrasion resistance of the obtained cured product tends to be excellent. When the content of the silica particle is 80% by mass or less, the transparency of the obtained cured product tends to be excellent.

Here, the total amount of the solids in the silanol composition is preferably the total amount of the cyclic silanol (A1) and the silica particle.

The silanol composition in this embodiment preferably further comprises a both-terminal silanol-modified siloxane represented by the following formula (6):

wherein each R' is independently fluorine, an aryl group, a vinyl group, an allyl group, a fluorine-substituted linear or branched alkyl group having 1 to 4 carbon atoms, or an unsubstituted linear or branched alkyl group having 1 to 4 carbon atoms, and m is an integer of 0 to 1000.

In formula (6), R' is preferably an unsubstituted linear or branched alkyl group having 1 to 4 carbon atoms, more preferably an unsubstituted alkyl group having 1 to 2 carbon atoms, and further preferably an unsubstituted methyl group from the viewpoint of suppressing thermal decomposition.

The molecular weight of the both-terminal silanol-modified siloxane represented by the formula (6) is preferably 10000 or less, more preferably 5000 or less, and further preferably 3500 or less from the viewpoint of compatibility with the cyclic silanol (A1).

The molecular weight of the both-terminal silanol-modified siloxane represented by the formula (6) is preferably 200 or more, more preferably 300 or more, and further preferably 400 or more from the viewpoint of suppressing volatilization.

The molecular weight of the both-terminal silanol-modified siloxane represented by the formula (6) can be measured by gel permeation chromatography (GPC).

Examples of the both-terminal silanol-modified siloxane include, but are not limited to, 1,1,3,3-tetramethyldisiloxanediol-1,3-diol, 1,1,3,3,5,5-hexamethyldisiloxane-1,5-diol, 1,1,3,3,5,5,7,7-octamethyltetrasiloxane-1,7-diol, 1,1,3,3,5,5,7,7,9,9-decamethylpentasiloxane-1,9-diol, and both-terminal diol-modified polymethyldimethyldisiloxane.

One both-terminal silanol-modified siloxane may be used alone, or two or more both-terminal silanol-modified siloxanes may be used in combination.

As the both-terminal silanol-modified siloxane, commercial products may be used. Examples of the commercial products include, but are not limited to, X21-5841 and KF9701 (manufactured by Shin-Etsu Chemical Co., Ltd.), and DMS-S12, DMS-S14, DMS-S15, DMS-S21, DMS-S27, DMS-S31, DMS-S32, DMS-S33, DMS-S35, DMS-S42, DMS-S45, and DMS-S51 (manufactured by Gelest).

The content of the both-terminal silanol-modified siloxane in the silanol composition in this embodiment is preferably 1 to 80% by mass, more preferably 10 to 60% by mass, and further preferably 15 to 50% by mass with respect to the amount of the silanol composition.

When the content of the both-terminal silanol-modified siloxane is 1% by mass or more, the crack resistance of the obtained cured product tends to be excellent. When the content of the content of the both-terminal silanol-modified siloxane is 80% by mass or less, the transparency of the obtained cured product tends to be excellent.

In the silanol composition in this embodiment, the total content of sodium (Na) and vanadium (V) is preferably less than 60 ppm.

When the total content of Na and V is less than 60 ppm, the storage stability tends to improve.

The total content of Na atoms and V atoms in the silanol composition is preferably 20 ppm or less, more preferably 12 ppm or less, further preferably 2 ppm or less, and still more preferably 1 ppm or less.

The content of each of Na and V in the silanol composition in this embodiment is preferably less than 30 ppm, more preferably 10 ppm or less, further preferably 6 ppm or less, and still more preferably 1 ppm or less from the viewpoint of storage stability.

Examples of the method for controlling the total content of Na and V in the silanol composition in this embodiment at less than 60 ppm include, but are not limited to, using powdered cellulose as a filter aid in the step of filtration when producing the silanol composition in this embodiment.

Examples of commercial products of powdered cellulose include, but are not limited to, KC FLOCK W50GK (manufactured by Nippon Paper Industries Co., Ltd.), KC FLOCK W100-GK (manufactured by Nippon Paper Industries Co., Ltd.), and cellulose powder through 38 μm (400 mesh) (manufactured by Wako Pure Chemical Industries, Ltd.).

Examples of the method for setting the content of Na and V in the silanol composition at less than 60 ppm include a method using a filter aid containing no Na or V, in addition to the above-described method.

The content of Na and V in the silanol composition can be measured according to a method described in Examples described later.

(Cured Product)

The cured product in this embodiment comprises the silanol composition in this embodiment.

The cured product in this embodiment is obtained by curing, that is, forming siloxane bonds (—Si—O—Si—) by the dehydration condensation reaction of silanol groups (—Si—OH) contained in the silanol composition in this embodiment, and is insoluble in solvents such as tetrahydrofuran and toluene.

One mode of this embodiment is a method for curing the silanol composition in this embodiment.

The cyclic silanol may be polymerized in the absence of a catalyst or may be polymerized by adding a catalyst.

The catalyst used in the polymerization of the cyclic silanol has the action of promoting the hydrolysis and condensation reactions of the cyclic silanol. As the catalyst, an acid catalyst or an alkali catalyst can be used.

The acid catalyst is not particularly limited, and preferred examples thereof include hydrochloric acid, nitric acid, sulfuric acid, phosphoric acid, hydrofluoric acid, formic acid, acetic acid, propionic acid, butyric acid, valeric acid, hexanoic acid, monochloroacetic acid, dichloroacetic acid, trichloroacetic acid, trifluoroacetic acid, oxalic acid, malonic acid, sulfonic acid, phthalic acid, fumaric acid, citric acid, maleic acid, oleic acid, methylmalonic acid, adipic acid, p-aminobenzoic acid, and p-toluenesulfonic acid.

The alkali catalyst is not particularly limited, and preferred examples thereof include sodium hydroxide, potassium hydroxide, sodium hydrogen carbonate, sodium carbonate, ammonium carbonate, ammonium hydrogen carbonate, ammonia water and organic amines. When an inorganic base is used, a composition for forming an insulating film comprising no metal ions is used.

For each of the acid catalyst and the alkali catalyst, one may be used alone, or two or more may be used in combination.

The amount of the catalyst added can be adjusted according to the reaction conditions and is preferably 0.000001 to 2 mol with respect to 1 mol of the hydroxyl groups of the cyclic silanol. When the amount added is more than 2 mol with respect to 1 mol of the hydroxyl groups of the cyclic silanol, the reaction rate is very fast even at low concentration and therefore the adjustment of molecular weight tends to be difficult, and a gel tends to form easily.

When the cured product is obtained, the silanol composition can be subjected to hydrolysis and condensation reactions in stages by using an acid catalyst and an alkali catalyst. Specifically, the cured product can be obtained by subjecting the silanol composition to hydrolysis and condensation reactions with an acid, followed by reactions with a base again, or first subjecting the silanol composition to hydrolysis and condensation reactions with a base, followed by reactions with an acid again. In addition, it is also possible to react the silanol compositions with an acid catalyst and an alkali catalyst respectively and then mix the condensation products for use as the silanol composition.

When the silanol composition in this embodiment is cured, it may be heated.

The temperature when the cured product is cured is not particularly limited but is preferably 60 to 250° C., more preferably 80 to 200° C.

In the method for curing the silanol composition in this embodiment, the silanol composition is preferably thermally cured for 10 min to 48 h.

The silanol composition in this embodiment can be used as an adhesive. The silanol composition in this embodiment is applied to a base material to form an adhesive layer, and the adhesive layer comprising the silanol composition is cured for adhesion. Examples of the base material include glass, silicon wafers, $SiO_2$ wafers, SiN wafers, and compound semiconductors.

EXAMPLES

The present invention will be more specifically described using Examples and Comparative Examples, but the present invention is not limited in any way by these Examples and the like.

The methods for measuring the physical properties of the silanol compositions obtained by the present invention and the following Examples and Comparative Examples, and the methods for evaluating the characteristics of the silanol compositions were as follows.

(Calculation of Weight Percent Concentration of Application Solution)

NMR measurement was performed as follows, using ECZ400S manufactured by JEOL Ltd. and a TFH probe for a probe.

For example, in the case of an isopropanol solution of tetrahydroxytetramethyltetracyclosiloxane and its polymer, $^1$H-NMR was measured using a sample obtained by adding 1 g of deuterated acetone to 0.1 g of the isopropanol solution of tetrahydroxytetramethyltetracyclosiloxane and its polymer. The base peak of the deuterated solvent was 2.05 ppm, and the measurement was performed with the number of accumulations being 64.

The weight percent concentration of tetrahydroxytetramethyltetracyclosiloxane and its polymer can be approximately calculated by the following formula:

the weight percent concentration of tetrahydroxytetramethyltetracyclosiloxane and its polymer=
(the peak integral ratio of the methyl groups bonded to Si in the region of −0.1-0.3 ppm/12×304.51)/{(the peak integral ratio of the methyl groups bonded to Si in the region of −0.1-0.3 ppm/12×304.51)+(the peak integral value of the hydrogen bonded to the carbon of isopropanol in the region of 3.7-4.1 ppm/1×60.1)} wherein 304.51 means the molecular weight of tetrahydroxytetramethyltetracyclosiloxane, and 60.1 means the molecular weight of isopropanol.

(Measurement of Haze)

Haze was measured with respect to JISK7136 using a turbidimeter NDH5000W (manufactured by Nippon Denshoku Industries Co., Ltd.). A specific operation is shown below.

For the haze of a silanol composition, a 42 wt % isopropanol solution of the silanol composition was applied to a blank glass substrate 5 cm×5 cm×0.7 mm thick (manufactured by Techno Print Co., Ltd.) using a bar coater No. 40 (manufactured by AS ONE Corporation) and then dried under reduced pressure at 60° C. for 1 h, and the haze was measured. For the blank in the haze measurement, only a blank glass substrate 5 cm×5 cm×0.7 mm thick (manufactured by Techno Print Co., Ltd.) was used.

For Examples 10 and 16 and Comparative Example 1, the haze after 24 h was also measured.

The haze of a cured product was measured using a sample obtained by heating a sample made in the measurement of the haze of a silanol composition, at atmospheric pressure at 100° C. for 2 h.

(Measurement of Film Thickness)

For film thickness, a sample made for the measurement of haze was measured by a surface shape measuring machine meter (manufactured by factory name: Kosaka Laboratory Ltd. model: ET4000AK31), and the film thickness was calculated.

(Confirmation of Adhesive Force)

A hemispherical quartz lens having a diameter of 2 mm was placed on a sample made in the measurement of the haze of a silanol composition, with a load of 400 g for 3 s using T-3000-FC3 Manual Die Bonder (manufactured by TRESKY). Then, heating was performed under atmospheric pressure at 100° C. for 2 h, and then the obtained glass on which the hemispherical lens was placed was pushed sideways, and the presence or absence of adhesion was confirmed.

(Measurement of Area % of Cyclic Silanol (A1) and Dehydration Condensation Product (A2) by GPC)

A solution obtained by dissolving a silanol composition in tetrahydrofuran in a proportion of 1.5 mL per 0.03 g of the silanol composition was used as a measurement specimen.

Measurement was performed by HLC-8220GPC manufactured by Tosoh Corporation, using this measurement specimen.

Analysis was performed at a rate of 0.35 ml/min using TSK guardcolumn SuperH-H, TSKgel SuperHM-H, TSKgel SuperHM-H, TSKgel SuperH2000, and TSKgel SuperH1000 manufactured by Tosoh Corporation, coupled in series, for columns, and tetrahydrofuran as a mobile phase.

Number average molecular weight and weight average molecular weight were obtained using an RI detector for a detector, and polymethyl methacrylate standard specimens (molecular weight: 2100000, 322000, 87800, 20850, 2000, 670000, 130000, 46300, 11800, 860) manufactured by American Polymer Standards Corporation, and 1,3,5,7-tetramethylcyclotetrasiloxane (molecular weight 240.5, manufactured by TOKYO CHEMICAL INDUSTRY CO., LTD.), as standard substances. Peaks at p =0 and p ≥1 were identified, and the area ratio between the respective peaks of a cyclic silanol (A1) and a dehydration condensation product (A2) was calculated.

(Content of Na and V and Content of Transition Metal (Pd))

Fluoronitric acid was added to a hydrosiloxane oxidation reaction product, and the mixture was subjected to sealed and pressurized acid decomposition. Then, the specimen was transferred to a Teflon (registered trademark) beaker and heated to dryness. Then, aqua regia was added to the specimen, the volume of the solution in which the specimen was completely dissolved was adjusted to 20 mL, and the quantitative analysis of the proportions of the metals in the specimen using an ICP mass spectrometer (iCAP Qc manufactured by Themo Fisher Scientific) was performed.

(Calculation of Proportions of Stereoisomers of Cyclic Silanol Using $^1$H-NMR Measurement)

NMR measurement was performed as follows, using ECZ400S manufactured by JEOL Ltd. and a TFH probe for a probe.

0.1 g of a product and 1 g of deuterated acetone were added to an obtained silanol composition, and $^1$H-NMR was measured. The base peak of the deuterated solvent was 2.05 ppm, and the measurement was performed with the number of accumulations being 64.

When oxidation was performed using, for a starting material, tetramethyltetracyclosiloxane as a hydrosilane compound, six types of peaks of the methyl groups bonded to Si, derived from four types of isomers were observed in the region of 0.04-0.95 ppm in the $^1$H-NMR of the obtained tetrahydroxytetramethyltetracyclosiloxane.

The hydrogen of the methyl groups was observed in the order of the all-cis type (0.057 ppm), the trans-trans-cis type (0.064 ppm), the trans-trans-cis type (0.067 ppm), the cis-trans-cis type (0.074 ppm), the all-trans type (0.080 ppm), and the trans-trans-cis type (0.087 ppm) from the high magnetic field side. Waveform separation by Lorentz transformation was performed for the six peaks using Delta 5.2.1

(manufactured by JEOL Ltd.), and from these peak intensities of hydrogen, the respective proportions of the stereoisomers of the cyclic silanol were calculated.
(Preparation of Stereoisomers) all-cis Isomer (Cyclic Silanol (B1))
The all-cis isomer was synthesized according to a synthesis example in Inorganic Chemistry Vol. 49, No. 2, 2010.
cis-trans-cis Isomer (Cyclic Silanol (B2))
The recrystallized product obtained in Example 1 was used.
all-trans Isomer (Cyclic Silanol (B4))
A tetrahydrofuran-dichloromethane mixed solution of 10 wt % of the silanol made in Example 1 was further concentrated, and concentrated to 20 wt % of the silanol. The fractionation of the stereoisomers was performed using the concentrated solution and using liquid chromatography.
<Conditions of Liquid Chromatography>
Apparatus liquid chromatography manufactured by GL SCIENCES INC.
Pump: PU715
Column oven: CO705
Fraction collector: FC204YMC-PackSIL-06 φ30 mm×250 mm
Eluent: Cyclohexane/EtoAc=60/40
Flow rate: 40 mL/min
Amount injected: 5 mL
Temperature: 40° C.
Detection: The obtained fractions were evaluated and detected by ELSD measurement.
The obtained eluent of the all-trans isomer was allowed to stand. Crystals of the all-trans isomer were obtained and therefore collected by filtration. trans-trans-cis Isomer (Cyclic Silanol (B3))
An eluent obtained by the same method as for the all-trans isomer was concentrated and then replaced by isopropanol to obtain the trans-trans-cis isomer.

Example 1

(Preparation of Silanol Composition)
28 g of distilled water, 960 mL of tetrahydrofuran (THF, manufactured by Wako Pure Chemical Industries, Ltd.), and 3.7 g of Pd/C (10% palladium-carbon, manufactured by N.E. CHEMCAT Corporation) were placed in a reaction container and mixed, and then the temperature of the reaction container was maintained at 5° C.
81 g of 1,3,5,7-tetramethylcyclotetrasiloxane (manufactured by TOKYO CHEMICAL INDUSTRY CO., LTD., also described as D4H) was gradually added to the reaction container, and the mixture was stirred for 2 h. Then, until the SiH groups disappeared in $^1$H-NMR, 1.8 g of Pd/C (10% palladium/carbon) was added three times, and the reaction was performed for a total of 17 h. For the disappearance of the SiH groups, with the reaction liquid, $^1$H-NMR was measured with a deuterated acetone solution of the reaction liquid at a concentration of 1 wt % using an NMR (ECZ400S) manufactured by JEOL Ltd., and the disappearance of the SiH groups at 4 to 5 ppm was confirmed.
75 g of magnesium sulfate was added to the reaction liquid, and the mixture was stirred at 5° C. for 30 min. Then, a funnel was filled with 450 g of Celite No. 545 (manufactured by Wako Pure Chemical Industries, Ltd.) using tetrahydrofuran. Then, the reaction liquid was passed through the Celite, and the Celite was washed with 1.5 L of tetrahydrofuran to obtain 2057 g of a 1,3,5,7-tetrahydroxy-1,3,5,7-tetramethyltetracyclosiloxane (hereinafter also described as D4OH)-containing THF solution. This solution was concentrated in a water bath at 15° C. using an evaporator to a remaining amount of 587 g (649 mL) and introduced into a mixed solvent of 4.4 L of dichloromethane and 217 mL of tetrahydrofuran. The mixed liquid was allowed to stand at 5° C. for 4 h, and then the precipitated insoluble matter was filtered under reduced pressure, and 22 g of the crystalline solid was collected. 6169 g of the filtrate of the soluble portion was concentrated under reduced pressure to obtain 89 g of a D4OH concentrate (that is, a hydrosiloxane oxidation reaction product).
Further, a both-terminal silanol-modified siloxane (X21-5841 manufactured by Shin-Etsu Chemical Co., Ltd., molecular weight 1000) and tetrahydrofuran were added to the D4OH concentrate so that D4OH concentrate:both-terminal silanol-modified siloxane:tetrahydrofuran was 8:2:90 in a mass ratio. The tetrahydrofuran was distilled off using an evaporator, and then a silanol composition was obtained.
The haze was measured according to the method in the above (Measurement of Haze) using the obtained silanol composition. In addition, the proportions of all-trans and cis-trans-cis cyclic silanols were calculated by $^1$H-NMR.
Further, the content of transition metal Pd was calculated as described above.
(Confirmation of Curing of Silanol Composition, Confirmation of Adhesive Force, and Measurement of Light Transmittance of Cured Product)
The silanol composition obtained in the above (Making of Silanol Composition) was applied to quartz glass using a bar coater No. 2, so as to be 3 μm thick. Quartz glass was placed, and the silanol composition was cured with a temperature program of 80° C. for 6 h and 180° C. for 6 h.
After the curing, only one glass plate was lifted, and it was confirmed that the glass adhered. Then, the haze of the obtained cured product was measured.
(Confirmation of Crack Resistance during Rapid Cooling after Curing)
The cured product was taken out of the oven at 180° C. to a room temperature of 25° C. and rapidly cooled, and was observed for the occurrence of cracks using a microscope.

Example 2

Except that D4OH concentrate:both-terminal silanol-modified siloxane:tetrahydrofuran was set to be 6:4:90 in a mass ratio, a silanol composition was obtained in the same manner as in Example 1, and experiments were performed in the same manner.

Example 3

Except that the both-terminal silanol-modified siloxane (X21-5841 manufactured by Shin-Etsu Chemical Co., Ltd., molecular weight 1000) was replaced by a both-terminal silanol-modified siloxane (KF-9701 manufactured by Shin-Etsu Chemical Co., Ltd., molecular weight 3000), a silanol composition was obtained in the same manner as in Example 1, and experiments were performed in the same manner.

Example 4

Except that the both-terminal silanol-modified siloxane (X21-5841 manufactured by Shin-Etsu Chemical Co., Ltd., molecular weight 1000) was replaced by a both-terminal silanol-modified siloxane (KF-9701 manufactured by Shin-Etsu Chemical Co., Ltd., molecular weight 3000), and D4OH concentrate:both-terminal silanol-modified siloxane:

tetrahydrofuran was set to be 6:4:90 in a mass ratio, a silanol composition was obtained in the same manner as in Example 1, and experiments were performed in the same manner.

Example 5

Except that the both-terminal silanol-modified siloxane (X21-5841 manufactured by Shin-Etsu Chemical Co., Ltd., molecular weight 1000) was replaced by a both-terminal silanol-modified siloxane (DMS-S15 manufactured by Gelest, molecular weight 2000 to 3500), a silanol composition was obtained in the same manner as in Example 1, and experiments were performed in the same manner.

Example 6

Except that the both-terminal silanol-modified siloxane (X21-5841 manufactured by Shin-Etsu Chemical Co., Ltd., molecular weight 1000) was replaced by a both-terminal silanol-modified siloxane (DMS-S15 manufactured by Gelest, molecular weight 2000 to 3500), and D4OH concentrate:both-terminal silanol-modified siloxane:tetrahydrofuran was set to be 6:4:90 in a mass ratio, a silanol composition was obtained in the same manner as in Example 1, and experiments were performed in the same manner.

Example 7

(Making of Silanol Composition)

28 g of distilled water, 960 mL of tetrahydrofuran (THF, manufactured by Wako Pure Chemical Industries, Ltd.), and 3.7 g of Pd/C (10% palladium-carbon, manufactured by N.E. CHEMCAT Corporation) were placed in a reaction container and mixed, and then the temperature of the reaction container was maintained at 5° C.

81 g of 1,3,5,7-tetramethylcyclotetrasiloxane (manufactured by TOKYO CHEMICAL INDUSTRY CO., LTD., also described as D4H) was gradually added to the reaction container, and the mixture was stirred for 2 h. Then, until the SiH groups disappeared in $^1$H-NMR, 1.8 g of the Pd/C (10% palladium-carbon) was added three times, and the reaction was performed for a total of 17 h.

With the reaction liquid, $^1$H-NMR was measured with a deuterated acetone solution of the reaction liquid at a concentration of 1% by mass using an NMR (ECZ400S) manufactured by JEOL Ltd., and the disappearance of the SiH groups at 4 to 5 ppm was confirmed.

75 g of magnesium sulfate was added to the reaction liquid, and the mixture was stirred at 5° C. for 30 min. Then, a funnel was filled with 450 g of Celite No. 545 (manufactured by Wako Pure Chemical Industries, Ltd.) using tetrahydrofuran. Then, the reaction liquid was passed through the Celite, and the Celite was washed with 1.5 L of tetrahydrofuran to obtain 2057 g of a 1,3,5,7-tetrahydroxy-1,3,5,7-tetramethyltetracyclosiloxane (hereinafter also described as D$_4$OH)-containing THF solution.

This solution was concentrated in a water bath at 15° C. using an evaporator to a remaining amount of 587 g (649 mL) and introduced into a mixed solvent of 4.4 L of dichloromethane and 217 mL of tetrahydrofuran. The mixed liquid was allowed to stand at 5° C. for 4 h, and then the precipitated insoluble matter was filtered under reduced pressure, and 22 g of the crystalline solid was collected. 6169 g of the filtrate of the soluble portion was concentrated under reduced pressure to obtain 89 g of a D4OH concentrate (that is, a hydrosiloxane oxidation reaction product).

Further, silica particles (MEKST-40, manufactured by Nissan Chemical Industries, Ltd., particle diameter 40 nm) were added to the D4OH concentrate so that for D4OH concentrate:silica, the mass ratio was 50:50. Further, isopropanol was added so as to obtain a solid concentration of 16% by mass, thereby obtaining a silanol composition (isopropanol solution).

Using the obtained silanol composition, the haze was measured according to the method in the above (Measurement of Haze), and the measurement of peak areas in a GPC differential molecular weight distribution curve was performed. In addition, the proportions of all-cis and cis-trans-cis cyclic silanols were calculated by $^1$H-NMR.

In addition, the content of transition metal Pd was calculated as described above.

(Confirmation of Curing of Silanol Composition, Confirmation of Adhesive Force, and Measurement of Light Transmittance of Cured Product)

8.3 g of the silanol composition obtained in the above (Making of Silanol Composition) was applied to quartz glass using a bar coater No. 2, so as to be 3 μm thick. Quartz glass was placed, and the silanol composition was cured with a temperature program of 80° C. for 6 h and 180° C. for 6 h.

After the curing, only one glass plate was lifted, and it was confirmed that the glass adhered. Then, the haze of the obtained cured product was measured.

(Evaluation of Abrasion Resistance of Cured Product)

A primer SHP470FT2050 (manufactured by Momentive) was applied to a polycarbonate plate 10 cm square and 1 mm thick (TAKIRON 1600) using a bar coater No. 16 (manufactured by AS ONE Corporation) and then cured in an oven at 30° C. for 30 min and at 120° C. for 30 min to obtain the polycarbonate plate to which the primer of 2 μm was applied.

The silanol composition obtained in the above (Making of Silanol Composition) was applied using a bar coater No. 16 to the polycarbonate plate to which the primer was applied, and then cured in an oven at 100° C. for 2 h and then at 120° C. for 2 h to obtain a cured plate.

The obtained cured plate was subjected to a 500 times Taber abrasion test at a rotation rate of 60 rpm using 101 TABER TYPE ABRASION TESTER (manufactured by Yasuda) in which CALIBRASE CS-10F (manufactured by TABER INDUSTRIES) was attached to an abrading wheel.

For all measurement samples, the abrading wheel was polished 25 times at a rotation rate of 60 rpm using ST-11 REFACING STONE (manufactured by TABER INDUSTRIES), before the Taber abrasion test was performed.

The measurement sample after the Taber abrasion test was subjected to the measurement of Haze using HAZE METER NDH 5000SP (manufactured by NIPPON DENSHOKU), and the increase in Haze (Δ Haze (%)) before and after the Taber abrasion test was calculated.

Example 8

The same experiments as in Example 7 were performed except that silica particles were added so that the D4OH concentrate:silica mass ratio was 75:25 (the proportion of silica added was 25 wt %).

Example 9

(Making of Silanol Composition)

28 g of distilled water, 960 mL of tetrahydrofuran (THF, manufactured by Wako Pure Chemical Industries, Ltd.), and 3.7 g of Pd/C (10% palladium/carbon, manufactured by N.E.

CHEMCAT Corporation) were placed in a reaction container and mixed, and then the temperature of the reaction container was maintained at 5° C.

81 g of 1,3,5,7-tetramethylcyclotetrasiloxane (manufactured by TOKYO CHEMICAL INDUSTRY CO., LTD., also described as D4H) was gradually added to the reaction container, and the mixture was stirred for 2 h. Then, until the SiH groups disappeared in $^1$H-NMR, 1.8 g of the Pd/C (10% palladium/carbon) was added three times, and the reaction was performed for a total of 17 h.

With the reaction liquid, $^1$H-NMR was measured with a deuterated acetone solution of the reaction liquid at a concentration of 1% by mass using an NMR (ECZ400S) manufactured by JEOL Ltd., and the disappearance of the SiH groups at 4 to 5 ppm was confirmed.

75 g of magnesium sulfate was added to the reaction liquid, and the mixture was stirred at 5° C. for 30 min. Then, a funnel was filled with 450 g of powdered cellulose KC FLOCK W50GK (manufactured by Nippon Paper Industries Co., Ltd.) as a filter aid using tetrahydrofuran. Then, the reaction liquid was passed through the powdered cellulose, and the powdered cellulose was washed with 1.5 L of tetrahydrofuran to obtain 2057 g of a 1,3,5,7-tetrahydroxy-1,3,5,7-tetramethyltetracyclosiloxane (hereinafter also described as D4OH)-containing THF solution.

This solution was concentrated in a water bath at 15° C. using an evaporator to a remaining amount of 587 g (649 mL) and introduced into a mixed solvent of 4.4 L of dichloromethane and 217 mL of tetrahydrofuran. The mixed liquid was allowed to stand at 5° C. for 4 h, and then the precipitated insoluble matter was filtered under reduced pressure, and 22 g of the crystalline solid was collected. 6169 g of the filtrate of the soluble portion was concentrated under reduced pressure to obtain a silanol composition (89 g) that was a hydrosiloxane oxidation reaction product.

Using the obtained silanol composition, the haze was measured according to the method in the above (Measurement of Haze), and the measurement of peak areas in a GPC differential molecular weight distribution curve was performed.

In addition, the proportions of all-trans and cis-trans-cis cyclic silanols were calculated by $^1$H-NMR. The measurement of the content of Na and V and the content of the transition metal (Pd) was performed as described above.

(Confirmation of Curing of Silanol Composition, and Confirmation of Adhesive Force, and Measurement of Light Transmittance of Cured Product)

8.3 g of the silanol composition obtained in the above (Preparation of Silanol Composition) was applied to quartz glass using a bar coater No. 2, so as to be 3 μm thick. Quartz glass was further placed thereon, and the silanol composition was cured with a temperature program of 80° C. for 6 h and 180° C. for 6 h. After the curing, only one glass plate was lifted, and it was confirmed that the quartz glass adhered.

Then, the light transmittance of the obtained cured product at 400 to 800 nm was measured.
(Storage Stability Test of Silanol Composition)

The obtained silanol composition was allowed to stand at a room temperature of 25° C. for 1 month.

The silanol composition was touched using a spatula, and whether the silanol composition hardened was confirmed. The storage stability was evaluated by whether the silanol composition solidified or not.

In the table, ○ indicates that the silanol composition did not solidify, and x indicates that the silanol composition solidified.

Example 10

(Preparation of Silanol Composition)

28 g of distilled water, 960 mL of tetrahydrofuran (manufactured by Wako Pure Chemical Industries, Ltd.), and 3.7 g of Pd/C (10% palladium/carbon, manufactured by N.E. CHEMCAT Corporation) were placed in a reaction container and mixed, and then the temperature of the reaction container was maintained at 5° C.

81 g of 1,3,5,7-tetramethylcyclotetrasiloxane (manufactured by TOKYO CHEMICAL INDUSTRY CO., LTD., also described as D4H) was gradually added to the reaction container, and the mixture was stirred for 2 h. Then, until the SiH groups disappeared in $^1$H-NMR, 1.8 g of Pd/C (10% palladium/carbon) was added three times, and the reaction was performed for a total of 17 h. For the disappearance of the SiH groups, with the reaction liquid, $^1$H-NMR was measured with a deuterated acetone solution of the reaction liquid at a concentration of 1 wt % using an NMR (ECZ400S) manufactured by JEOL Ltd., and the disappearance of the SiH groups present at 4 to 5 ppm was confirmed.

75 g of magnesium sulfate was added to the reaction liquid, and the mixture was stirred at 5° C. for 30 min. A funnel was filled with 450 g of Celite No. 545 (manufactured by Wako Pure Chemical Industries, Ltd.) using tetrahydrofuran. Then, the reaction liquid was passed through the Celite, and the Celite was washed with 1.5 L of tetrahydrofuran to obtain 2057 g of a 1,3,5,7-tetrahydroxy-1,3,5,7-tetramethyltetracyclosiloxane (hereinafter also described as D4OH)-containing THF solution. This solution was concentrated in a water bath at 15° C. using an evaporator to a remaining amount of 587 g (649 mL) and introduced into a mixed solvent of 4.4 L of dichloromethane and 217 mL of tetrahydrofuran. The mixed liquid was allowed to stand at 5° C. for 4 h, and then the precipitated insoluble matter was filtered under reduced pressure, and 22 g of the crystalline solid was collected. 6169 g of the filtrate of the soluble portion was concentrated under reduced pressure, and concentrated until it became a tetrahydrofuran-dichloromethane mixed solution of 10 wt % of a silanol composition. 10 g of the tetrahydrofuran-dichloromethane mixed solution of 10 wt % of the silanol composition was concentrated to 1 g under reduced pressure, and then 100 g of isopropanol was added again. Further, the mixture was concentrated under reduced pressure again to make the silanol composition (isopropanol solution) at a predetermined concentration.

Figure 1:
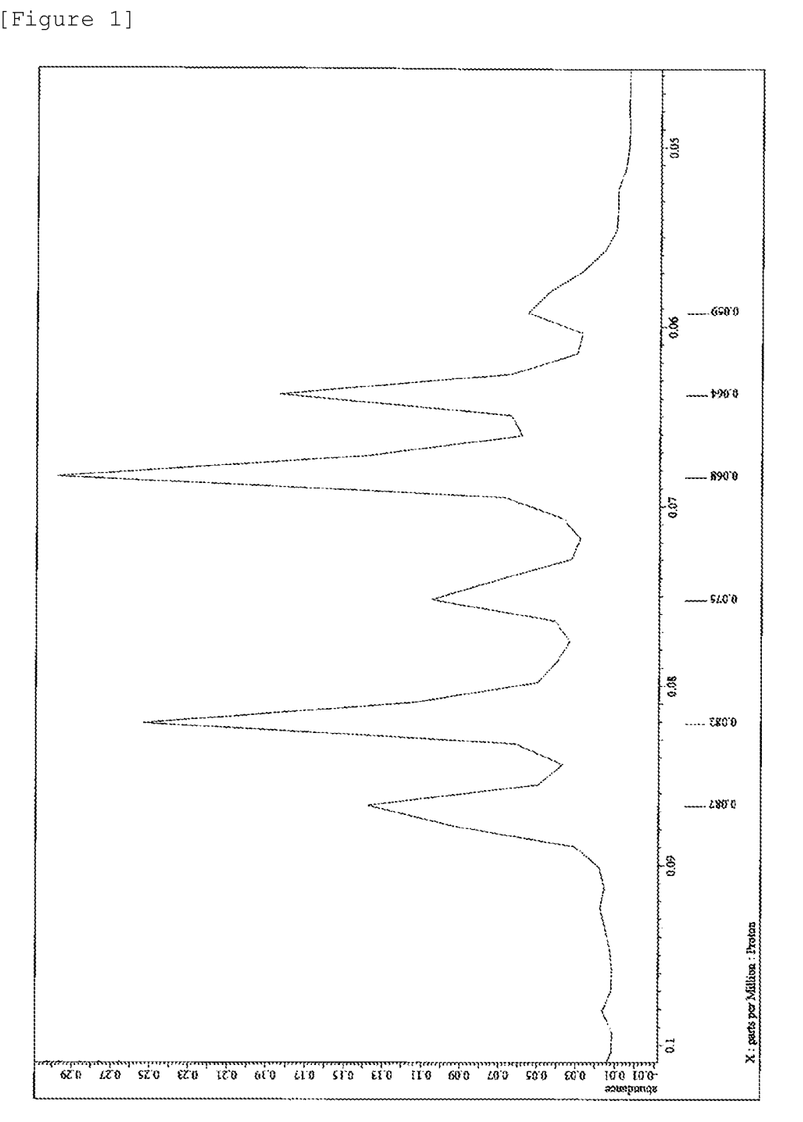
FIG. 1 shows a diagram showing the $^1$H-NMR spectrum used when calculating the proportions of the stereoisomers of the silanol composition obtained in Example 10.

The physical properties such as haze were evaluated using the obtained silanol composition. In addition, the proportions of the stereoisomers of the cyclic silanol were calculated by $^1$H-NMR. The $^1$H-NMR spectrum is shown in FIG. 1.

Example 11

The same experiments as in Example 10 were performed except that the all-trans isomer (cyclic silanol (B4)) prepared in the above (Preparation of Stereoisomers) was added to the silanol composition (isopropanol solution) made in Example 10, and the all-trans isomer ratio was 43%.

Example 12

The same experiments as in Example 10 were performed except that the all-trans isomer (cyclic silanol (B4)) prepared in the above (Preparation of Stereoisomers) was added to the silanol composition (isopropanol solution) made in Example 10, and the all-trans isomer ratio was 56%.

Example 13

The same experiments as in Example 10 were performed except that the all-cis isomer (cyclic silanol (B1)) prepared in the above (Preparation of Stereoisomers) was added to the silanol composition (isopropanol solution) made in Example 10, and the all-cis isomer ratio was 31%.

Example 14

The same experiments as in Example 10 were performed except that the all-cis isomer (cyclic silanol (B1)) prepared in the above (Preparation of Stereoisomers) was added to the silanol composition (isopropanol solution) made in Example 10, and the all-cis isomer ratio was 41%.

Example 15

The same experiments as in Example 10 were performed except that the trans-trans-cis isomer (cyclic silanol (B3)) prepared in the above (Preparation of Stereoisomers) was added to the silanol composition (isopropanol solution) made in Example 10, and the trans-trans-cis isomer ratio was 66%.

Example 16

Figure 2:
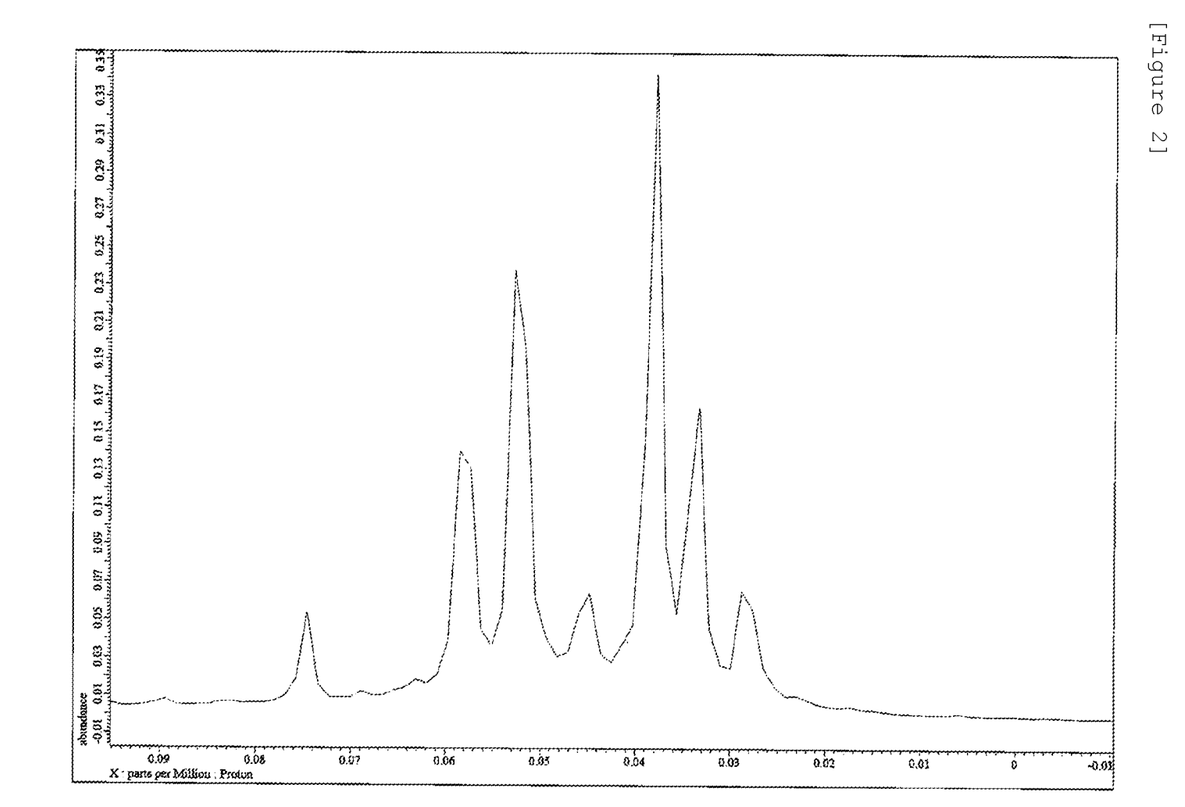
FIG. 2 shows a diagram showing the $^1$H-NMR spectrum used when calculating the proportions of the stereoisomers of the silanol composition obtained in Example 16.

The same experiments as in Example 10 were performed except that the recrystallization temperature in Example 10 was −40° C. The $^1$H-NMR spectrum is shown in FIG. 2.

Comparative Example 1

The same experiments as in Example 10 were performed except that the recrystallization operation in which the concentrate of the D4OH-containing THF solution was introduced into a mixed solvent of 4.4 L of dichloromethane and 217 mL of tetrahydrofuran, the mixed liquid was allowed to stand at 5° C. for 4 h, and then the precipitated insoluble matter was filtered under reduced pressure was not performed.

Comparative Example 2

15 g of distilled water, 30 g of tetrahydrofuran, and 500 mg of Pd/C (10% palladium/carbon) were placed in a reaction container and mixed to obtain a solution, and then the temperature of the reaction container was maintained at 0° C. 10 g of 1,3,5,7-tetramethylcyclotetrasiloxane was gradually added to the solution, and the mixture was reacted overnight. The disappearance of the SiH groups was confirmed.

After the reaction, the solution was passed through Celite No. 545 (manufactured by Wako Pure Chemical Industries, Ltd.) and filtered to remove the metal catalyst. Further, the organic solvent was removed by pressure reduction to obtain 19 g of a silanol composition.

Comparative Example 3

A silanol composition (isopropanol solution) at a concentration of 5% was prepared using the all-cis isomer (cyclic silanol (B1)) prepared in the above (Preparation of Stereoisomers), and the same experiments as in Example 10 were performed.

Comparative Example 4

A silanol composition (isopropanol solution) at a concentration of 5% was prepared using the cis-trans-cis isomer (cyclic silanol (B2)) prepared in the above (Preparation of Stereoisomers), and the same experiments as in Example 10 were performed.

Comparative Example 5

A silanol composition (isopropanol solution) at a concentration of 5% was prepared using the all-trans isomer (cyclic silanol (B4)) prepared in the above (Preparation of Stereoisomers), and the same experiments as in Example 10 were performed.

Comparative Example 6

A silanol composition (solution) at a concentration of 5% was prepared using the trans-trans-cis isomer (cyclic silanol (B3)) prepared in the above (Preparation of Stereoisomers), and the same experiments as in Example 10 were performed.

The physical properties and evaluation results of the silanol compositions and the cured products obtained in the Examples and the Comparative Examples are shown in Table 1 and Table 2.

TABLE 1

|  | Example 1 | Example 2 | Example 3 | Example 4 | Example 5 | Example 6 |
| --- | --- | --- | --- | --- | --- | --- |
| Starting material: cyclic siloxane | D4H | D4H | D4H | D4H | D4H | D4H |
| Proportion of all-cis cyclic silanol (%) | 6 | 6 | 6 | 6 | 6 | 6 |
| Proportion of cis-trans-cis cyclic silanol (%) | 12 | 12 | 12 | 12 | 12 | 12 |
| Proportion of all-trans cyclic silanol (%) | 25 | 25 | 25 | 25 | 25 | 25 |
| Proportion of trans-trans-cis cyclic silanol (%) | 57 | 57 | 57 | 57 | 57 | 57 |
| (A2)/[(A1) + (A2)] area ratio (%) | 20 | 20 | 20 | 20 | 20 | 20 |
| Residual transition metal (Pd) content (ppm) | <1 | <1 | <1 | <1 | <1 | <1 |
| Recrystallization temperature (° C.) | 5 | 5 | 5 | 5 | 5 | 5 |
| Both-terminal silanol-modified siloxane | X21-5841 | X21-5841 | KF-9701 | KF-9701 | DMS-S15 | DMS-S15 |

TABLE 1-continued

|  | | | | | | |
|---|---|---|---|---|---|---|
| Molecular weight of both-terminal silanol-modified siloxane | 1000 | 1000 | 3000 | 3000 | 2000-3500 | 2000-3500 |
| Proportion of both-terminal silanol-modified siloxane added (wt % vs curable composition) | 20 | 40 | 20 | 40 | 20 | 40 |
| Silica | — | — | — | — | — | — |
| Proportion of silica added (wt % vs solids) | 0 | 0 | 0 | 0 | 0 | 0 |
| Filter aid | Celite | Celite | Celite | Celite | Celite | Celite |
| Na content (ppm) | 30 | 30 | 30 | 30 | 30 | 30 |
| V content (ppm) | 30 | 30 | 30 | | 30 | 30 |
| Adhesive force | Adhered | Adhered | Adhered | Adhered | Adhered | Adhered |
| Occurrence of cracks after rapid cooling | No | No | No | No | No | No |
| Storage stability | — | — | — | — | — | — |
| Δ Haze (%) after Taber abrasion test | — | — | — | — | — | — |
| Film thickness (μm) | 3 | 3 | 3 | 3 | 3 | 3 |
| Haze (%) of silanol composition | 0.2 | 0.2 | 0.2 | 0.2 | 0.2 | 0.2 |
| Haze (%) of curable composition after standing for 24 h | — | — | — | — | — | — |
| Haze (%) of cured product of silanol composition | 0.2 | 0.2 | 0.2 | 0.2 | 0.2 | 0.2 |

|  | Example 7 | Example 8 | Example 9 | Example 10 | Example 11 |
|---|---|---|---|---|---|
| Starting material: cyclic siloxane | D4H | D4H | D4H | D4H | D4H |
| Proportion of all-cis cyclic silanol (%) | 6 | 6 | 6 | 6 | 4 |
| Proportion of cis-trans-cis cyclic silanol (%) | 12 | 12 | 12 | 12 | 10 |
| Proportion of all-trans cyclic silanol (%) | 25 | 25 | 25 | 25 | 43 |
| Proportion of trans-trans-cis cyclic silanol (%) | 57 | 57 | 57 | 57 | 43 |
| (A2)/[(A1) + (A2)] area ratio (%) | 20 | 20 | 20 | 20 | 20 |
| Residual transition metal (Pd) content (ppm) | <1 | <1 | <1 | <1 | <1 |
| Recrystallization temperature (° C.) | 5 | 5 | 5 | 5 | 5 |
| Both-terminal silanol-modified siloxane | — | — | — | — | — |
| Molecular weight of both-terminal silanol-modified siloxane | — | — | — | — | — |
| Proportion of both-terminal silanol-modified siloxane added (wt % vs curable composition) | 0 | 0 | 0 | 0 | 0 |
| Silica | MEK-ST40 | MEK-ST40 | — | — | — |
| Proportion of silica added (wt % vs solids) | 50 | 25 | 0 | 0 | 0 |
| Filter aid | Celite | Celite | Powdered cellulose | Celite | Celite |
| Na content (ppm) | 30 | 30 | ND | 6 | — |
| V content (ppm) | 30 | 30 | ND | 6 | — |
| Adhesive force | Adhered | Adhered | Adhered | Adhered | Adhered |
| Occurrence of cracks after rapid cooling | — | — | — | — | — |
| Storage stability | — | — | ○ | ○ | — |
| Δ Haze (%) after Taber abrasion test | 11 | 20 | 40 | 40 | — |
| Film thickness (μm) | 3 | 3 | 3 | 3 | 3 |
| Haze (%) of silanol composition | 0.2 | 0.2 | 0.2 | 0.2 | 0.4 |
| Haze (%) of curable composition after standing for 24 h | — | — | — | 1 | — |

TABLE 1-continued

| | | | | | |
|---|---|---|---|---|---|
| Haze (%) of cured product of silanol composition | 0.2 | 0.2 | 0.2 | 0.2 | 1 |

TABLE 2

| | Example 12 | Example 13 | Example 14 | Example 15 | Example 16 | Comparative Example 1 |
|---|---|---|---|---|---|---|
| Starting material: cyclic siloxane | D4H | D4H | D4H | D4H | D4H | D4H |
| Proportion of all-cis cyclic silanol (%) | 3 | 31 | 41 | 5 | 7 | 9 |
| Proportion of cis-trans-cis cyclic silanol (%) | 12 | 9 | 8 | 13 | 4 | 25 |
| Proportion of all-trans cyclic silanol (%) | 56 | 17 | 14 | 16 | 27 | 15 |
| Proportion of trans-trans-cis cyclic silanol (%) | 29 | 43 | 37 | 66 | 62 | 51 |
| (A2)/[(A1) + (A2)] area ratio (%) | 20 | 20 | 20 | 20 | 20 | 20 |
| Residual transition metal (Pd) content (ppm) | <1 | <1 | <1 | <1 | <1 | 20 |
| Recrystallization temperature (° C.) | 5 | 5 | 5 | 5 | −40 | — |
| Both-terminal silanol-modified siloxane | — | — | — | — | — | — |
| Molecular weight of both-terminal silanol-modified siloxane | — | — | — | — | — | — |
| Proportion of both-terminal silanol-modified siloxane added (wt % vs curable composition) | 0 | 0 | 0 | 0 | 0 | 0 |
| Silica | — | — | — | — | — | — |
| Proportion of silica added (wt % vs solids) | 0 | 0 | 0 | 0 | 0 | 0 |
| Filter aid | Celite | Celite | Celite | Celite | Celite | Celite |
| Na content (ppm) | — | — | — | — | — | 30 |
| V content (ppm) | — | — | — | — | — | 30 |
| Adhesive force | Adhered | Adhered | Adhered | Adhered | Adhered | Peeled |
| Occurrence of cracks after rapid cooling | — | — | — | — | — | Yes |
| Storage stability | — | — | — | — | — | X |
| Δ Haze (%) after Taber abrasion test | — | — | — | — | — | 40 |
| Film thickness (μm) | 3 | 3 | 3 | 3 | 3 | 3 |
| Haze (%) of silanol composition | 1 | 0.2 | 0.2 | 1 | 0.1 | 13 |
| Haze (%) of curable composition after standing for 24 h | — | — | — | — | 0.1 | 30 |
| Haze (%) of cured product of silanol composition | 1 | 0.2 | 0.2 | 1 | 0.1 | 13 |

| | Comparative Example 2 | Comparative Example 3 | Comparative Example 4 | Comparative Example 5 | Comparative Example 6 |
|---|---|---|---|---|---|
| Starting material: cyclic siloxane | D4H | D4H | D4H | D4H | D4H |
| Proportion of all-cis cyclic silanol (%) | 9 | 100 | 0 | 0 | 0 |
| Proportion of cis-trans-cis cyclic silanol (%) | 25 | 0 | 100 | 0 | 0 |
| Proportion of all-trans cyclic silanol (%) | 15 | 0 | 0 | 100 | 0 |
| Proportion of trans-trans-cis cyclic silanol (%) | 51 | 0 | 0 | 0 | 100 |
| (A2)/[(A1) + (A2)] area ratio (%) | 60 | — | — | — | — |
| Residual transition metal (Pd) content (ppm) | 20 | <1 | 20 | <1 | <1 |
| Recrystallization temperature (° C.) | — | — | — | — | — |

TABLE 2-continued

| | | | | | |
|---|---|---|---|---|---|
| Both-terminal silanol-modified siloxane | — | — | — | — | — |
| Molecular weight of both-terminal silanol-modified siloxane | — | — | — | — | — |
| Proportion of both-terminal silanol-modified siloxane added (wt % vs curable composition) | 0 | 0 | 0 | 0 | 0 |
| Silica | — | — | — | — | — |
| Proportion of silica added (wt % vs solids) | 0 | 0 | 0 | 0 | 0 |
| Filter aid | Celite | Celite | Celite | Celite | Celite |
| Na content (ppm) | — | — | — | — | — |
| V content (ppm) | — | — | — | — | — |
| Adhesive force | Peeled | Peeled | Peeled | Peeled | Peeled |
| Occurrence of cracks after rapid cooling | — | — | — | — | — |
| Storage stability | — | — | — | — | — |
| Δ Haze (%) after Taber abrasion test | — | — | — | — | — |
| Film thickness (μm) | 3 | 0.3 | 0.3 | 0.3 | 0.3 |
| Haze (%) of silanol composition | 20 | 40 | 40 | 20 | 20 |
| Haze (%) of curable composition after standing for 24 h | 40 | — | — | — | — |
| Haze (%) of cured product of silanol composition | 20 | 40 | 40 | 20 | 20 |

This application is based on Japanese Patent Application No. 2017-157074 filed on Aug. 16, 2017, Japanese Patent Application No. 2017-242154 filed on Dec. 18, 2017, Japanese Patent Application No. 2017-242155 filed on Dec. 18, 2017, and Japanese Patent Application No. 2017-242161 filed on Dec. 18, 2017, the contents of which are incorporated herein by reference.

INDUSTRIAL APPLICABILITY

The silanol composition of the present invention has industrial applicability in the protection, sealing, and adhesion of semiconductor devices such as light-emitting diode devices, and the change or adjustment of the wavelength of light emitted from light-emitting diode devices, and in the fields of lens and the like. Further, the silanol composition of the present invention has industrial applicability in the fields of various optical materials such as lens materials, materials for optical devices and optical components, and display materials, insulating materials for electronic devices and electronic components, coating materials, and the like.

The invention claimed is:

1. A silanol composition comprising:
a cyclic silanol (A1) represented by the following formula (1):

Formula (1)

wherein $R^1$ to $R^4$ are each independently fluorine, an aryl group, a vinyl group, an allyl group, a fluorine-substituted linear or branched alkyl group having 1 to 4 carbon atoms, or an unsubstituted linear or branched alkyl group having 1 to 4 carbon atoms; and a dehydration condensation product (A2) of the cyclic silanol, and wherein the silanol composition has a haze of 10% or less at a thickness of 3 μm.

2. The silanol composition according to claim 1, wherein the cyclic silanol (A1) comprises cyclic silanols (B1) to (B4) represented by the following formulas (2) to (5):

(B1)

(2)

(B2)

(3)

(B3)

-continued (4)

(5)

wherein $R^1$ to $R^4$ are each independently fluorine, an aryl group, a vinyl group, an allyl group, a fluorine-substituted linear or branched alkyl group having 1 to 4 carbon atoms, or an unsubstituted linear or branched alkyl group having 1 to 4 carbon atoms, and 0<b≤20 is satisfied when a proportion (mol %) of the cyclic silanol (B2) with respect to a total amount of the cyclic silanols (B1) to (B4) is b.

3. The silanol composition according to claim 1, wherein an area of the dehydration condensation product (A2) is more than 0% and 50% or less with respect to a total area of the cyclic silanol (A1) and the dehydration condensation product (A2) in a gel permeation chromatography measurement.

4. The silanol composition according to claim 1, wherein a proportion of a transition metal is less than 1 ppm.

5. The silanol composition according to claim 1, comprising a solvent.

6. The silanol composition according to claim 1, comprising a silica particle having an average particle diameter of 1 nm or more and 100 nm or less.

7. The silanol composition according to claim 1, comprising a both-terminal silanol-modified siloxane represented by the following formula (6):

(6)

wherein each R' is independently fluorine, an aryl group, a vinyl group, an allyl group, a fluorine-substituted linear or branched alkyl group having 1 to 4 carbon atoms, or an unsubstituted linear or branched alkyl group having 1 to 4 carbon atoms, and m is an integer of 0 to 1000.

8. The silanol composition according to claim 1, wherein a total content of Na and V is less than 60 ppm.

9. A cured product comprising the silanol composition according to claim 1.

10. An adhesive comprising the silanol composition according to claim 1.

11. A method for curing the silanol composition according to claim 1, comprising:
thermally curing the silanol composition at 60 to 250° C.

12. The method according to claim 11, wherein the silanol composition is thermally cured for 10 min to 48 h.

\* \* \* \* \*